United States Patent
Ichimiya et al.

(10) Patent No.: US 7,830,902 B2
(45) Date of Patent: Nov. 9, 2010

(54) ARBITER, CROSSBAR, REQUEST SELECTION METHOD AND INFORMATION PROCESSING DEVICE

(75) Inventors: Junji Ichimiya, Kawasaki (JP); Takayuki Kinoshita, Kawasaki (JP); Shintarou Itozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 11/740,658

(22) Filed: Apr. 26, 2007

(65) Prior Publication Data

US 2008/0043767 A1 Feb. 21, 2008

(30) Foreign Application Priority Data

Aug. 18, 2006 (JP) .............................. 2006-223670

(51) Int. Cl.
*H04L 12/56* (2006.01)

(52) U.S. Cl. ...................................... 370/412; 710/316

(58) Field of Classification Search ................ 370/357, 370/395, 461; 710/120, 244, 116, 107; 711/5, 711/136

See application file for complete search history.

(56) References Cited

U.S. PATENT DOCUMENTS

| | | | | |
|---|---|---|---|---|
| 5,463,624 A | * | 10/1995 | Hogg et al. | 370/461 |
| 5,463,696 A | * | 10/1995 | Beernink et al. | 382/186 |
| 5,617,545 A | | 4/1997 | Ogata et al. | |
| 5,884,051 A | * | 3/1999 | Schaffer et al. | 710/107 |
| 5,930,256 A | * | 7/1999 | Greene et al. | 370/397 |
| 6,393,512 B1 | * | 5/2002 | Chen et al. | 711/5 |
| 6,487,213 B1 | * | 11/2002 | Chao | 370/418 |
| 6,519,666 B1 | * | 2/2003 | Azevedo et al. | 710/120 |
| 6,567,885 B1 | * | 5/2003 | Marmash | 710/316 |
| 6,665,760 B1 | * | 12/2003 | Dotson | 710/240 |
| 6,667,983 B1 | * | 12/2003 | Lo et al. | 370/412 |
| 6,754,210 B1 | * | 6/2004 | Ofek | 370/389 |
| 7,013,357 B2 | * | 3/2006 | Murdock et al. | 710/240 |
| 7,020,161 B1 | * | 3/2006 | Eberle et al. | 370/468 |
| 7,023,840 B2 | * | 4/2006 | Golla et al. | 370/360 |
| 7,061,929 B1 | * | 6/2006 | Eberle et al. | 370/423 |
| 7,088,710 B1 | * | 8/2006 | Johnson et al. | 370/357 |
| 7,096,291 B2 | * | 8/2006 | Lin | 710/241 |

(Continued)

FOREIGN PATENT DOCUMENTS

JP 5-342178 12/1993

(Continued)

OTHER PUBLICATIONS

Extended European Search Report issued in corresponding European Patent Application No. 07106876.1, on Dec. 20, 2007.

(Continued)

*Primary Examiner*—Thong H Vu
(74) *Attorney, Agent, or Firm*—Staas & Halsey LLP

(57) ABSTRACT

A plurality of units (processing units) connected to a crossbar are divided into a plurality of groups and one is selected from requests selected for each group according to priority among the groups that changes at prescribed time intervals. Thus, the number of times per unit time requests issued from units belonging to a group whose priority is improved at the prescribed time intervals can be maintained over a certain value regardless of a request state.

11 Claims, 11 Drawing Sheets

U.S. PATENT DOCUMENTS

| | | | |
|---|---|---|---|
| 7,149,227 B2 * | 12/2006 | Stoler et al. | 370/442 |
| 7,284,080 B2 * | 10/2007 | Lin et al. | 710/244 |
| 7,287,111 B2 * | 10/2007 | Hur | 710/244 |
| 7,299,311 B1 * | 11/2007 | Sepeda et al. | 710/116 |
| 7,305,492 B2 * | 12/2007 | Bryers et al. | 709/249 |
| 7,366,811 B2 * | 4/2008 | Nicholas | 710/118 |
| 2004/0006659 A1 | 1/2004 | Lee | |
| 2004/0083326 A1 | 4/2004 | Wang et al. | |
| 2005/0125581 A1 | 6/2005 | Brown et al. | |
| 2008/0016254 A1 * | 1/2008 | Kruger et al. | 709/251 |

FOREIGN PATENT DOCUMENTS

| | | |
|---|---|---|
| JP | 2000-112876 | 4/2000 |
| JP | 2004-005727 | 1/2004 |
| JP | 2006-065457 | 3/2006 |
| KR | 10-2004-0010957 | 2/2004 |
| WO | 02/48891 | 6/2002 |

OTHER PUBLICATIONS

Office Action issued in corresponding Korean Patent Application No. 10-2007-0049785; mailed on May 19, 2008.

Chinese Office Action issued Dec. 5, 2008 in corresponding Chinese Patent Application 2007101040966.

European Office Action dated Apr. 15, 2010 and issued in corresponding European Patent Application 11/740,658.

* cited by examiner

| PRIORITY CONTROL | SETTING MODE |
|---|---|
| H | CPU PRIORITY |
| L | IO PRIORITY |

F I G. 1 0

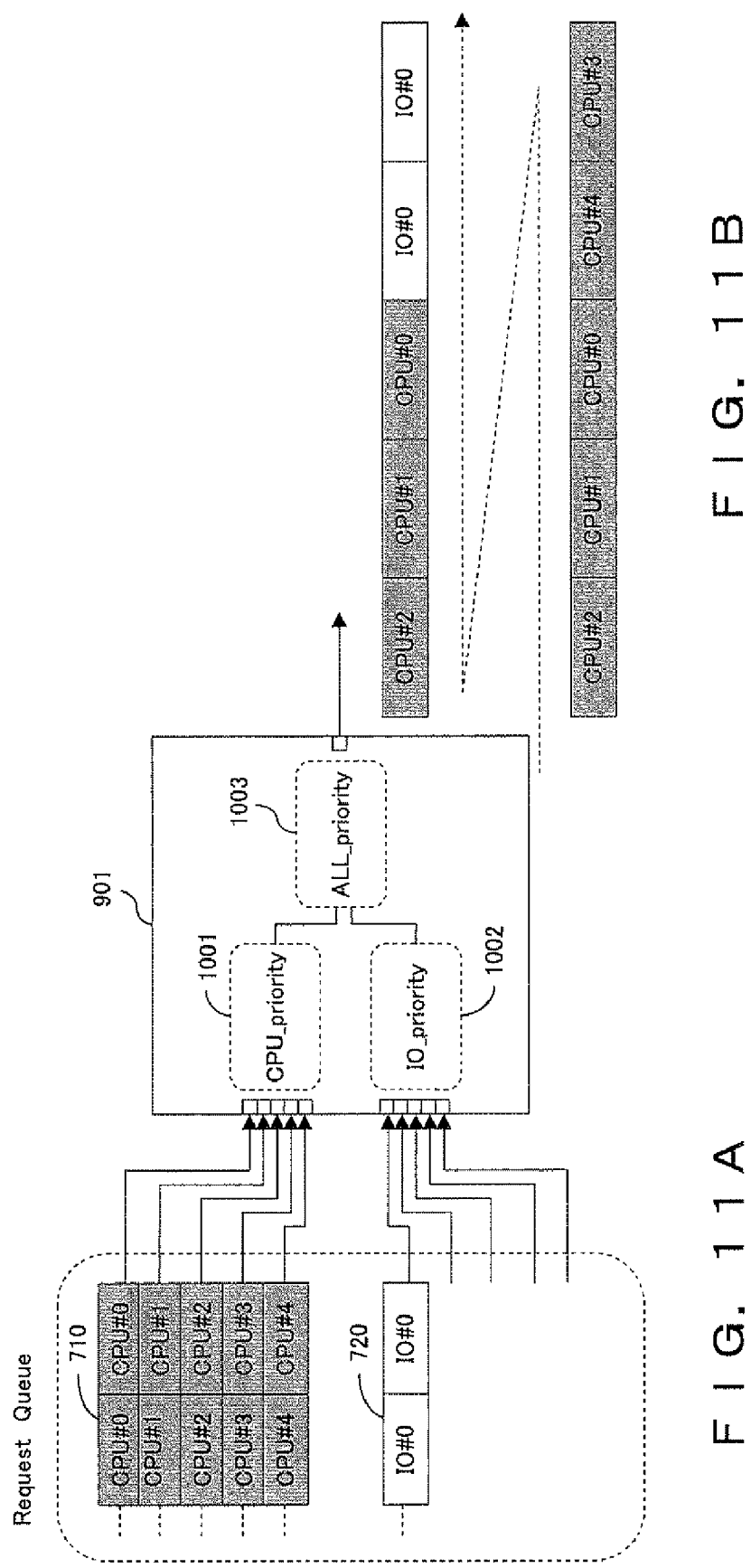

ARBITER, CROSSBAR, REQUEST SELECTION METHOD AND INFORMATION PROCESSING DEVICE

CROSS REFERENCE TO RELATED APPLICATIONS

The present application claims priority to Japanese Patent Application 2006-223670 filed Aug. 18, 2006, the entire contents of which are hereby incorporated herein by reference.

BACKGROUND OF THE INVENTION

1. Field of the Invention

The present invention relates to a technology for selecting one from requests issued by each unit by a crossbar to which a plurality of units are connected.

2. Description of the Related Art

Recently some computers (information processing devices) have mounted a plurality of physically separated units. For the units, a system board (SB) mounting a CPU and memory and an IO unit mounting a hard disk device, an IO device, a PC slot or the like are usually prepared. This is because a CPU resource and a memory resource can be flexibly assigned according to the situation. In other words, such resources can be efficiently used thus. A computer with such a configuration mounts one or more system boards and IO units. A crossbar is used to connect them each other.

FIG. 1 explains the computer configuration in which a plurality of units is connected by a crossbar. As shown in FIG. 1, one or more system boards 10 and IO units 20 are connected to each of two global address crossbars 30 (hereinafter called "address crossbar") and each of four global data crossbar 40 (hereinafter called "data crossbar"). A managing board (MB) 50 is an exclusive managing unit and is connected to each of the units 10-40 by an SM bus.

The two address crossbar 30 performs the same request control at the same time. Thereby, the address crossbar 30 is made double in hardware. Four data crossbar 40 is prepared because a lot of data is transmitted usually at once.

"#0" and "#1" are assigned to each of the two address crossbar 30. Thus, when one of the two address crossbar is specified, "#0" or "#1" is attached to the symbol. This also applies to the data crossbars 40.

FIG. 2 explains the configuration example of the system board 10 and the IO unit 20.

The system board 10 comprises four CPUs 101, two FWHs (firmware hub) 102, a north bridge 103, four memory switches (described as "mem. switch" in FIG. 2) 104 and a plurality of pieces of memory 105 connected to each memory switch 104. The IO unit 20 comprises a south bridge 201, two SERs 202 connected to the bridge 201, two ICH6s 203 connected to each SER 202 and six controllers 211-216 connected to each ICH6. As controllers, an FWH 211, an SIO (super IO) controller 212, a BMC (baseboard management controller) 213, a VGA (video graphics array) controller, two LAN adapters 215 and 216 are connected to the ICH6 203. The BMC 213 is used to communicate with the MB 50. The ICH6 203 is an I/O controller hub. The controllers 211-216 shown in FIG. 2 is one example, and its type and quantity can be arbitrarily modified. The controllers 211-216 can also be determined for each IO unit 20.

The south bridge 201 of the IO unit 20 is connected to each of the two address crossbars 30 and four data crossbars 40. The bridge 201 controls each of the controllers 211-216 via the SER 202 and the ICH6 203. When one of the controllers 211-216 transfers obtained data, it issues such a request (address request) and outputs the request to the address crossbar 30. When it receives data to be transferred from the system board 10 via the data crossbar 40, it transmits the data to a controller to which the data should be transmitted via the SER 202 and ICH6 203, and enables the controller to store, output or transmit the data.

Each of the four CPUs 101 on the system board 10 issues a read/write command to the memory 105, another system board 10 or the IO unit 20 and outputs the command to the north bridge 103. The north bridge 103 temporarily stores the commands inputted from each CPU 101, selects one of the commands according to priority, issues the command as a request (address request) and outputs the request to each address crossbar 30 and each of the four memory switches 104.

The data transferred via the data crossbar 40 is received by the memory switch 104, is outputted to the north bridge 103 and is transferred to the CPU 101 which needs the data by the bridge 103. Data to be transferred to another system board 10 or the IO unit 20 is transmitted and transferred to the data crossbar 40 by the memory switch 104. Hereinafter requests issued and outputted from the system board 10 and the IO unit 20 to the address crossbar are called "CPU request" and "IO request", respectively, for convenience' sake.

Each of the system boards 10 and IO units 20 outputs a request to the address crossbar as requested. Thus, the requests are collected to the address crossbar 30 and there easily remains the same number of un-processed requests as a plurality of units. Therefore, the address crossbar 30 is mounted with an arbiter for selecting one of a plurality of requests issued by different units. FIG. 3 explains the configuration of the conventional arbiter.

Requests issued and outputted by the system board 10 and the IO unit 20 are temporarily stored in a module for system board (hereinafter called "SM module") 310 and a module for IO board (hereinafter called "IO module") 320, respectively. The module 310 comprises a plurality of queue buffer units 311 for storing requests for each unit. Each queue buffer unit 311 comprises a queue control unit (described "queue control" in FIG. 3) 312 for controlling the queue buffer units 311 and a request storing buffer 313. The buffer 313 can store a plurality of requests, and "queue 1"-"queue 5" described in FIG. 3 indicate requests stored in the buffer 313. The smaller is the value of a numeral "1"-"5", the queue is stored earlier. For example, "queue 1" is the request that is stored earliest. The queue buffer unit 311 is also prepared in the IO module 320, which is not shown in FIG. 3. Thus, the same symbols as those of the SM module 310 are also attached to the queue buffer units prepared in the IO module 320.

The conventional arbiter 330 comprises a priority logic (described as "priority" in FIG. 3) 331 and a selector 332. Requests are outputted from the SM module 310 and the IO module 320 to the selector 332 for each queue buffer unit 311. A request outputted by each queue buffer unit 311 is stored earliest.

The queue control unit 312 of each queue buffer unit 311 outputs a queue exist signal indicating whether a request is stored in the buffer unit 313 to the priority logic 331. The logic 331 specifies a unit with an unprocessed request by the signal and selects a unit from which a request should be selected from the units according to a regulated rule (priority rule). The logic 331 outputs a selection signal to the selector 332 according to the selection result to enable the selector 332 to select and output a request from the selected unit. The request is transmitted to the unit to which the request should be transmitted or is broadcast. When it is broadcast, the request is transmitted to the other all units.

The priority logic 331 notifies the queue control unit 312 of a queue buffer unit 311 corresponding to the unit from which a request is selected of the selection of the request. By the notification, the queue control unit 312 erases the selected request. When there remains a request, a request which is stored earliest of the requests is outputted to the selector 332. Thus, only un-processed requests are left in the buffer unit 313. When a newly issued request is received, a free area is sought on the buffer unit 313 and the request is stored in the area.

FIG. 4 explains priority determined by a rule adopted by the conventional arbiter. In FIG. 4, each of "request 1"-"request 8" is issued by different units. Initial priority indicates priority initially determined among the issuing units. For example, the unit that issues "request 1" has top priority and one that issues "request 8" has the lowest priority. A selected request corresponds to one selected and outputted by the selector 332.

Priority among the issuing units is dynamically modified by an actually selected request. When "request 2" is selected, the lowest priority is given to the issuing unit of "request 2" and top priority is given to the issuing unit of "request 3". Similarly, when "request 5" is selected, the lowest priority is given to the issuing unit of "request 5" and top priority is given to the issuing unit of "request 6". When "request 8" is selected, the lowest priority is given to the issuing unit of "request 8" and top priority is given to the issuing unit of "request 1". In other words, priority is retuned to the initial one. Thus, by changing priority every time a request is selected, a request can be uniformly selected from the issuing units.

When selecting a request according to the above-described rule, the actually selected order of requests is as follows according to the situation. The order is described in detail with reference to FIGS. 5A-6B.

FIGS. 5A and 5B show the order of requests selected by the conventional arbiter where five units of the system board 10 and five units of the IO unit 20 are mounted. FIG. 5A shows a unit that issues a request to be selected by the arbiter 330. FIG. 5B shows the actually selected order of requests.

In FIG. 5A, each of "CPU#0"-"CPU#4" indicates requests issued from a different system board 10. Similarly, each of "IO#0"-"IO#4" indicates requests issued from a different IO unit 20. It is because "CPU#0"-"CPU#4" are stored in the SM module that "310" is attached to the frame of those requests. It is for the same reason that "320" is attached to the frame of "IO#0"-"IO#4".

In this case, priority is given in the order of "IO#0"-"IO#4" and "CPU#0"-"CPU#4". It is assumed that an unprocessed request exists in all the units. In this state, the priority logic 331 selects requests in the order shown in FIG. 5B. Actually, requests are selected in the order of "IO#0"-"IO#4" and "CPU#0"-"CPU#4" as anticipated.

FIGS. 6A and 6B show the order of requests selected by the conventional arbiter where five units of the system boards 10 and one unit of the IO unit 20 are mounted. Like FIGS. 5A and 5B, FIG. 6A shows a unit that issues a request to be selected by the arbiter 330 and FIG. 6B shows the actually selected order of requests.

In this case, priority is given in the order of "CPU#0", "IO#0", "CPU#1"-"CPU#4". It is assumed that an un-processed request exists in all the units and two "IO#" exist. In this state, the priority logic 331 selects requests in the order shown in FIG. 6B. Actually, requests are selected in the order of "CPU#0", "IO#0", "CPU#1"-"CPU#4" and after that, requests are selected in the same order of "CPU#0", "IO#0", "CPU#1" and "CPU#2".

As shown in FIG. 4, by changing priority among issuing units, requests from the units can be uniformly selected (processed). However, in such a request state where each unit issues requests at fairly short intervals, the requests issued by each unit must be sequentially processed (FIGS. 5A and 5B). Therefore, a time until each unit selects a subsequent request after selecting one request becomes long. The time becomes long so that the number of units increases. As shown in FIGS. 6A and 6B, if some unit consecutively issues a plurality of requests, in such a request state, the second request and after are selected only after a request issued by another unit later is selected. Therefore, a time interval until a request is actually selected after it is issued greatly depends on the request state. If a plurality of requests are consecutively issued, there is a possibility that a time interval (process time) until a request is actually selected after it is issued may become very long.

In the unit that issues a request with a very long process time, the using efficiency of the resources decreases and as a result, the overall performance of a computer (system) decreases. When the process time becomes equal to or more than a certain time, that is, times out, it is regarded that the process of an issued request fails and the request is re-issued. Such timeout greatly reduces and sometimes also stops the system. Therefore, it is very important to avoid a request issued from one of the units from being kept un-processed for a long time.

As reference literatures, there are Japanese Patent Application Nos. H05-342178, 2000-112876, 2006-65457 and 2004-5727.

SUMMARY OF THE INVENTION

It is an object of the present invention to provide a technology for avoiding a request issued from one of the units being kept un-processed for a long time.

Each of the arbiters in the first and second aspects of the present invention presumes to enable a crossbar, to which a plurality of units are connected, to select one from requests issued by each unit. The arbiter comprises a first request selection part for selecting one from requests issued by each of the units belonging to the same group and a second request selection part for selecting one from the requests that the first request selection part selects for each of the groups and it further comprises the following part.

The arbiter in the first aspect comprises a selection control part for making the second request selection part selects a request according to priority among the plurality of predetermined groups. The priority among the groups changes at prescribed time intervals.

The arbiter in the second aspect comprises a selection control part for making the second request selection part selects a request according to priority among the plurality of predetermined groups. The priority among the groups dynamically changes.

Each of the crossbars in the first and second aspects of the present invention presumes that a plurality of units is connected to it and comprises an arbiter in the first and second aspect.

Each of the request selection method in the first and second aspects of the present invention presumes to be used to enable a crossbar, to which a plurality of units are connected, to select one from requests issued by each unit and it selects a request as follows.

In the request selection method of the first aspect, units are divided into a plurality of groups, one is selected from requests issued by each of the units belonging to the same group for each group and one is selected from the requests selected for each group according to priority among the groups, which changes at predetermined time intervals.

In the request selection method of the second aspect, units are divided into a plurality of groups, one is selected from requests issued by each of the units belonging to the same group for each group and one is selected from the requests selected for each group according to priority among the groups, which dynamically changes.

The information processing device of the present invention comprises a plurality of processing units divided into a plurality of groups, each for issuing requests, a first request selection part for arbitrating the requests issued from the plurality of processing units and selecting one from requests issued each of the processing units belonging to the same group, a second request selection part for selecting one from the requests that the first selection part selects for each group and a selection control part for making the second request selection part requests according to priority among a plurality of predetermined groups. The priority among the groups comprises an arbiter that is dynamically changed.

In the present invention, units (processing units) are divided into a plurality of groups, one is selected from requests issued by each of the units belonging to the same group and one is selected from the requests selected for each group according to priority among the groups that changes at prescribed time intervals.

By changing priority among the groups in order to select one from the requests selected for each group at prescribed time intervals, the number of times per unit time a request issued from a unit belonging to a group whose priority is improved at each time interval can be kept over a certain value regardless of a request state. Therefore, by selecting a group to which a unit with a fairly high possibility that an issued request is kept un-processed for a long time belongs as a group in which a request is selected with priority at each time interval, the occurrence of a unit in which an issued request is kept un-processed for a long time can be avoided regardless of a request state.

BRIEF DESCRIPTION OF THE DRAWINGS

FIG. 10 shows the relationship between the level of a priority control signal S1 and a priority type to be set; and FIGS. 11A and 11B show the order of requests selected by the arbiter 900 of the second referred embodiment in the case where there is a plurality of requests issued by each of five system boards 10 and there is a plurality of requests issued by the IO unit 20.

DESCRIPTION OF THE PREFERRED EMBODIMENTS

The preferred embodiments of the present invention are described in detail below with reference to the drawings.

The First Preferred Embodiment

Figure 1:
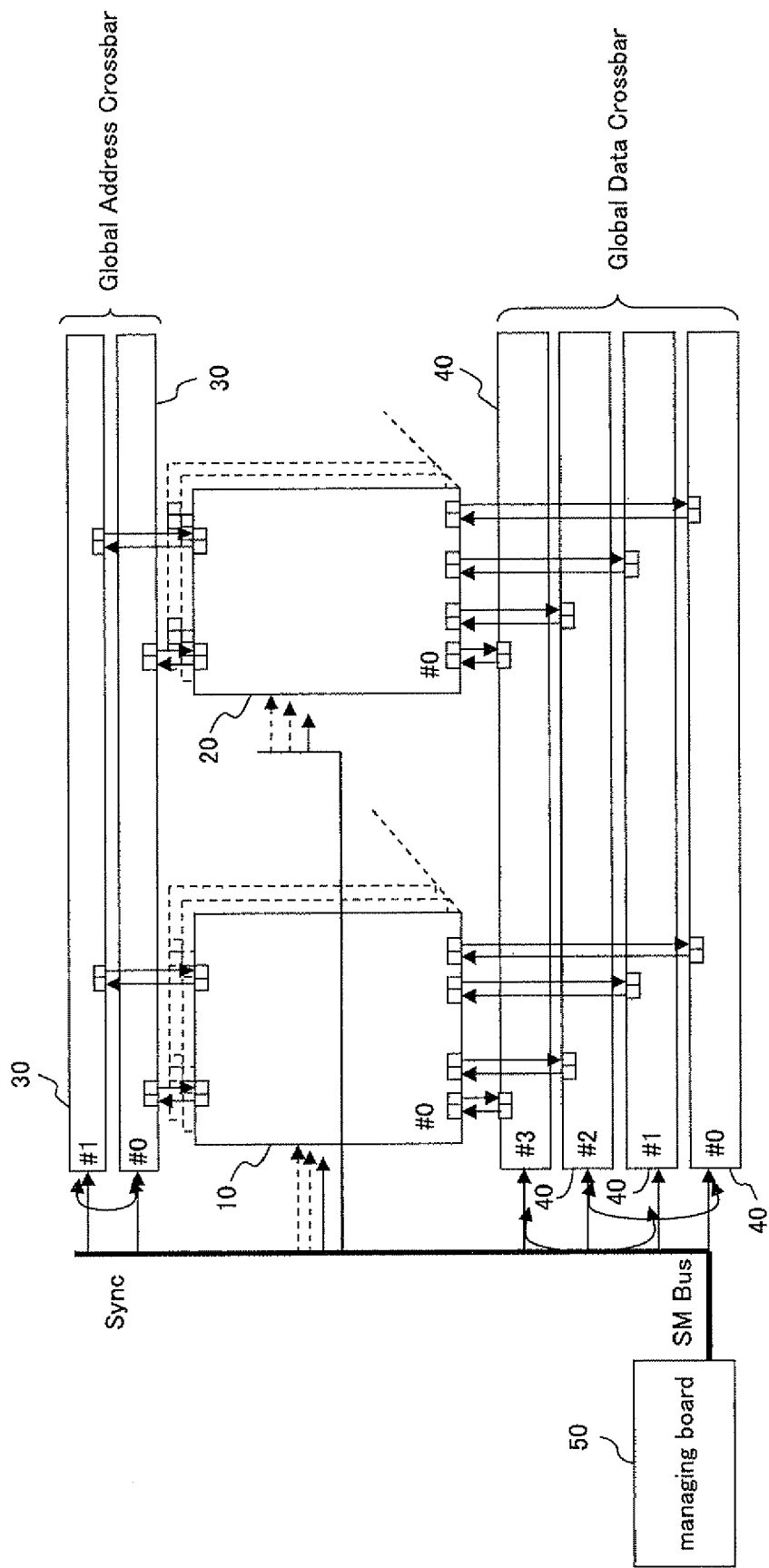
FIG. 1 shows the configuration of a computer to which a crossbar connects a plurality of units.
Figure 2:
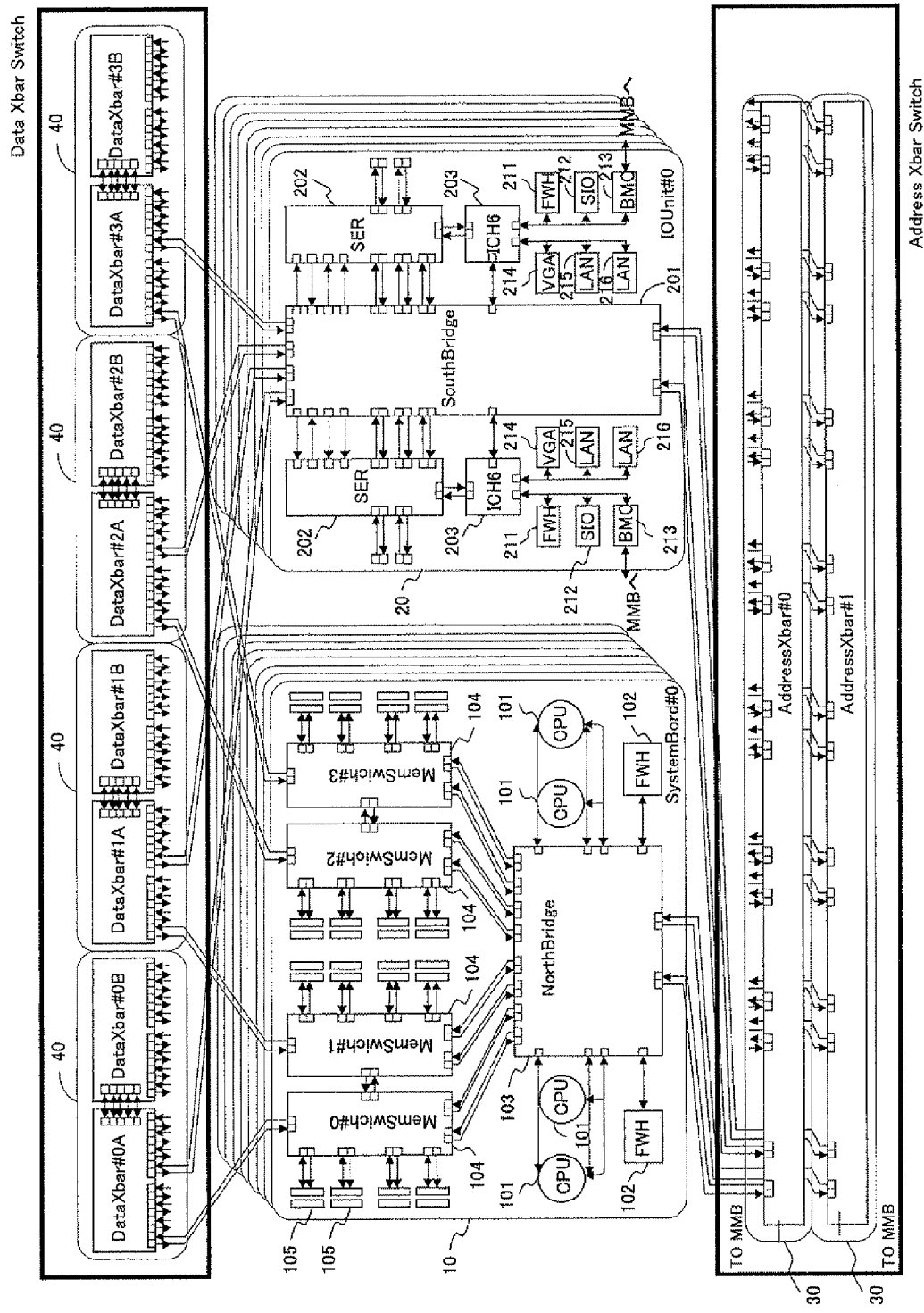
FIG. 2 shows the configuration examples of the system board 10 and the IO unit 20.
Figure 3:
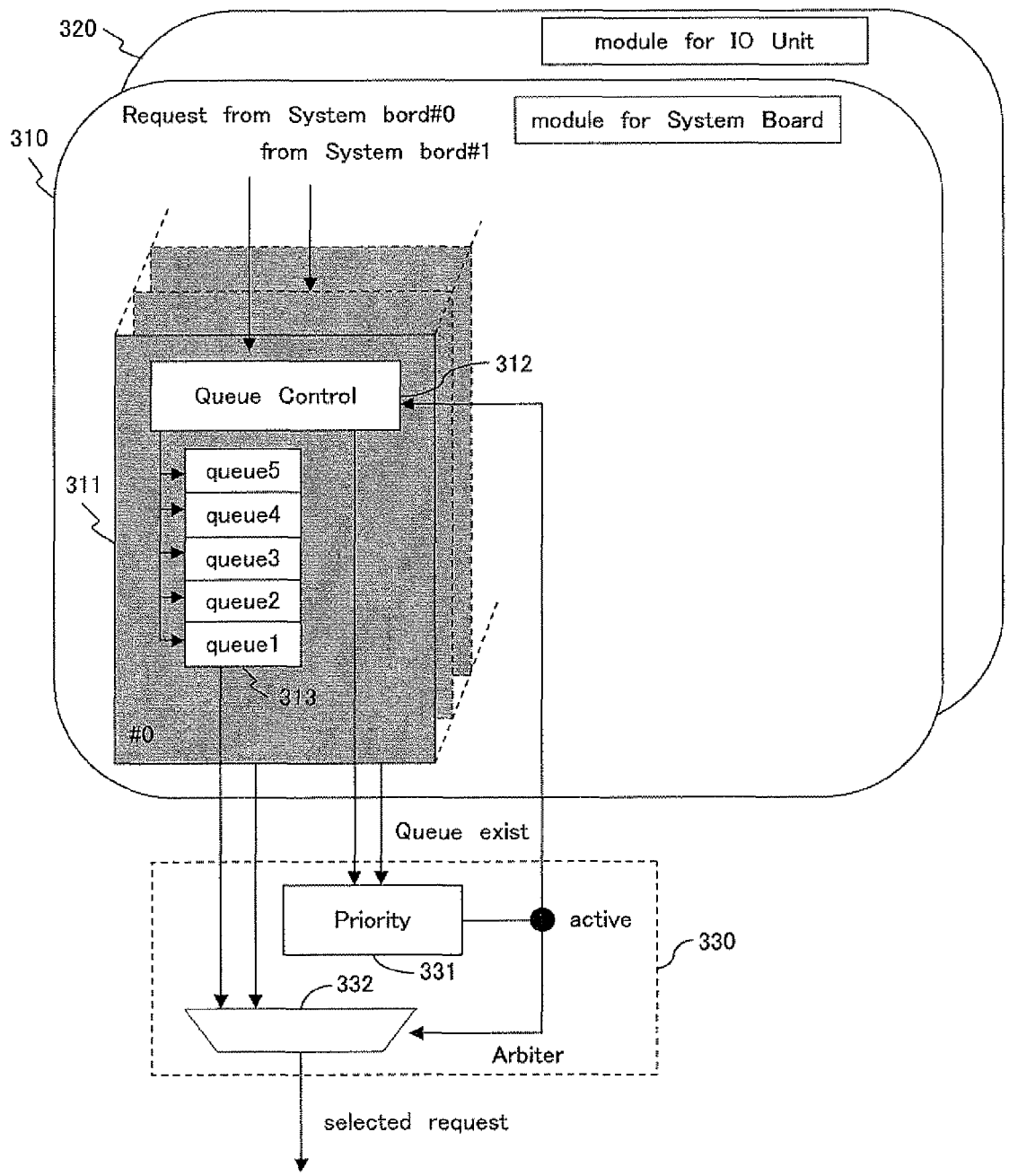
FIG. 3 shows the configuration of the conventional arbiter.
Figure 7:
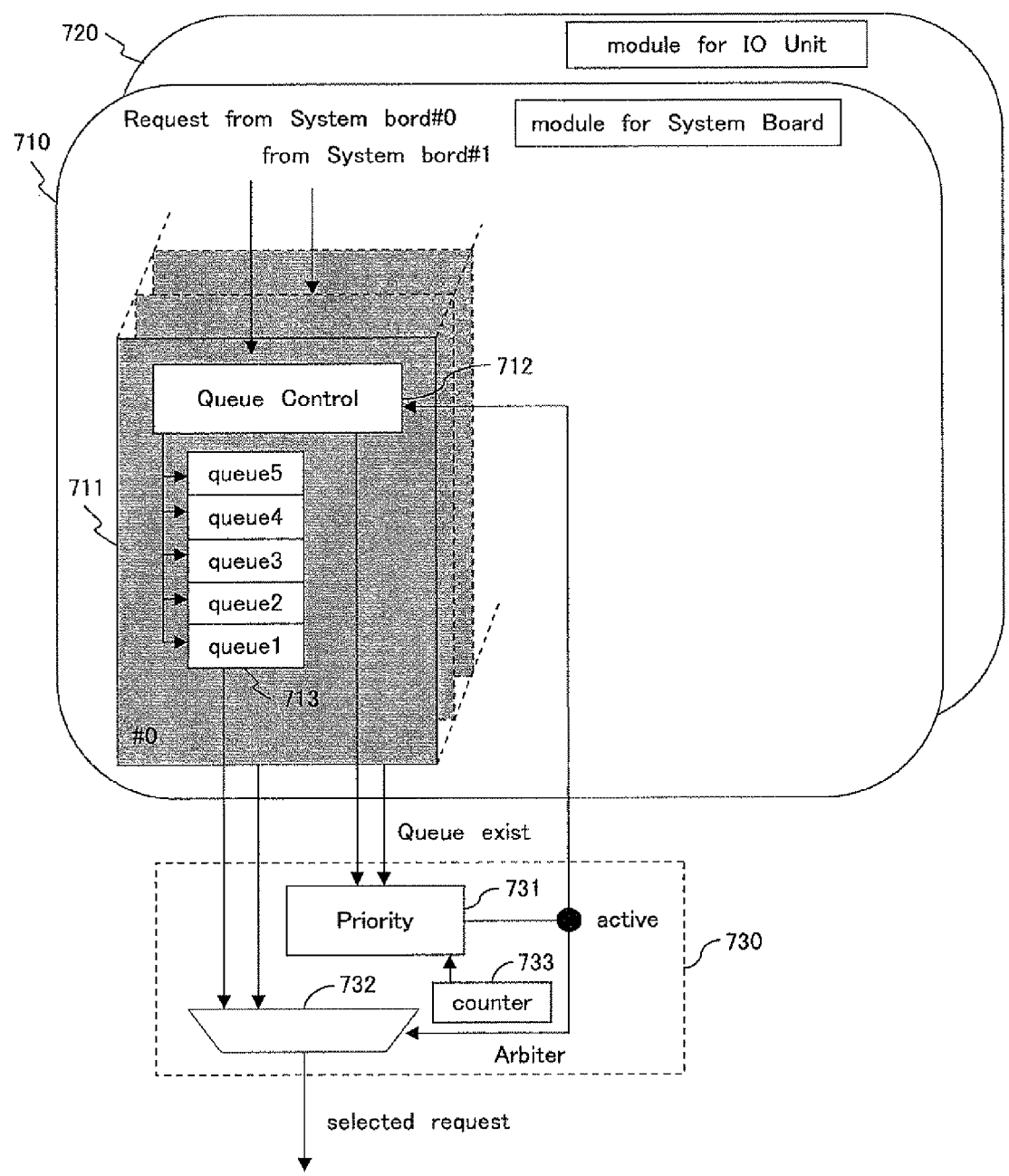
FIG. 7 shows the configuration of the arbiter of the first preferred embodiment.

FIG. 7 shows the configuration of the arbiter of the first preferred embodiment. The arbiter 730 is mounted on the address crossbar 30 shown in FIG. 1 or 2 in order to select requests issued by each of the system boards 10 and IO units 20. Thus, the crossbar of this preferred embodiment can be realized as an address crossbar 30 mounting the arbiter 730. The information processing device of this preferred embodiment is realized by the crossbar 30 connecting the system boards 10 and the IO units 20 each other. Each of the system board 10 and the IO unit 20 corresponds to a processing unit.

Requests issued and outputted by the system boards 10 and IO units 20 are temporarily stored in a module for system board (hereinafter called "SM module") 710 and a module for IO unit (hereinafter called "IO module") 720, respectively. The module 710 comprises a plurality of queue buffer units 711 for storing requests for each unit. Each queue buffer unit 711 comprises a queue control unit (described as "queue control" in FIG. 7) 712 for controlling the queue buffer units 711 and a request storing buffer unit 713. The buffer unit 713 can store a plurality of requests and each of "queue 1"-"queue 5" described in FIG. 7 indicates a request stored in the buffer unit 713. The smaller is the value of the numeral of "1"-"5", the queue is stored earlier. For example, "queue 1" is the request that is stored earliest. The queue buffer unit 711 is also prepared in the IO module 720, which is not shown in FIG. 7. Thus, the same symbols as those of the SM module 710 are also attached to the queue buffer units prepared in the IO module 720.

As shown in FIG. 7, the arbiter 730 of this preferred embodiment comprises a priority logic (described as "priority" in FIG. 7) 731, a selector 732 and a counter 733. A request is outputted from each of the SM module 710 and the IO module 720 to the selector 732 for each queue buffer unit 711. The outputted request is earliest stored.

The queue control unit 712 of each queue buffer unit 711 outputs a queue exist signal indicating whether a request is stored in the buffer unit 713 to the priority logic 731. The logic 731 specifies the unit in which an unprocessed request exists by the signal and selects a unit whose request should be selected according to a then valid (applied) rule (priority rule). The logic 731 outputs a selection signal to the selector 732 according the selection result to enable it to select/output the request of the selected unit. The request is transmitted to a unit to which it should be transmitted or is broadcast. When it is broadcast, the request is transmitted to the other all units.

The valid rule dynamically changes by a signal from the counter 733. For example, when the counter 733 counts up to the maximum countable value, its count becomes 0 and outputs a carrier signal whose logical value is 1. Its counting clock is, for example, a system clock or one obtained by dividing it. The priority logic 731, for example, temporarily changes a rule a plurality of times, for example, every time a carrier signal whose logical value is 1 inputted from the counter 733. Hereinafter a time interval for outputting a carrier signal and a time interval for changing the temporary rule are called "measurement period" and "period A", respectively.

A rule that is temporarily valid during each period A is, for example, to select a request issued from one of the system board 10 and the IO unit 20 with priority. According to the rule (hereinafter called "temporary rule"), a request issued by one (hereinafter called "priority type") is compulsorily selected once during the period A. When the temporary rule is not validated, for example, the rule shown in FIG. 4 (hereinafter called "conventional rule") is validated. Since the conventional rule regularly validates the temporary rule, in other words, a request issued by a unit to which priority is given by the temporary rule is compulsorily selected, the unit to which priority is given exceptionally selects a request.

A request to be selected when the temporary rule is valid is selected, for example, by the conventional rule. Thus, actually the conventional rule selects requests for each of the priority type and non-priority type and one is selected from the requests selected for each of priority type and non-priority type according to priority among the requests. In other words, units 10 and 20 are divided into priority type and non-priority type, one is selected for each group and one is selected from the requests selected for each group according to priority among the groups. Therefore, a priority change by the temporary rule is made by the change of priority between priority type and non-priority type.

The priority logic 731 notifies the queue control unit 712 of a queue buffer unit 711 corresponding to a unit from which a request is selected of the selection of the request. By the notification, the queue control unit 712 erases the selected request. When there remains a request, the queue control unit 712 outputs a request that is earliest stored of the requests to the selector 732. Thus, there remain only unprocessed requests in the buffer unit 713. When a newly issued request is received, the queue control unit 712 looks for a free area on the buffer unit 713 and stores the request in the area.

Figure 8:
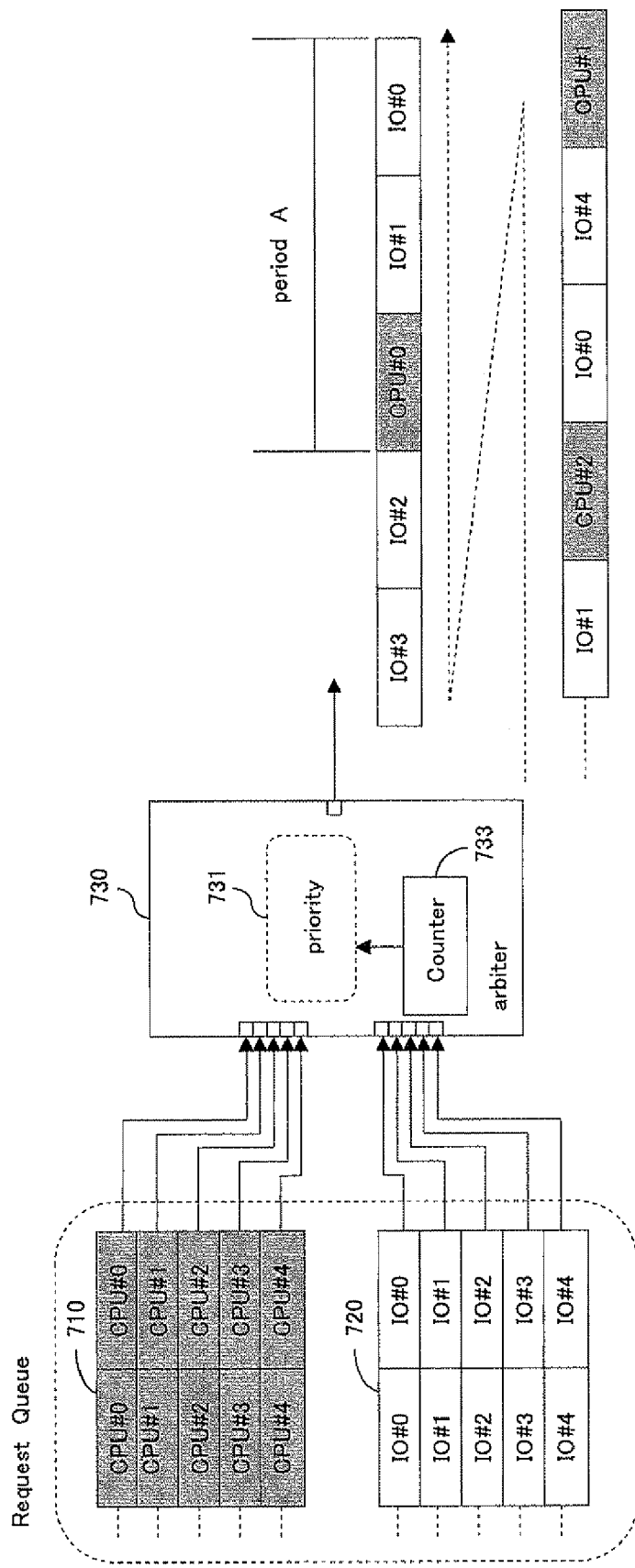
FIGS. 8A and 8B show the order of requests selected by the arbiter 730 of the first preferred embodiment in the case where five system boards 10 and five IO units are mounted.

FIGS. 8A and 8B show the order of requests selected by the arbiter 730 of the first preferred embodiment in the case where five system boards 10 and five IO units are mounted. FIG. 8A shows a unit that issues a target request to be selected by the arbiter 730 and FIG. 8B shows the actually selected order of requests.

In FIG. 8A, each of "CPU#0"-"CPU#4" indicates a request issued by a different system board 10. Similarly, each of "IO#0"-"IO#4" indicates a request issued by a different IO unit 20. It is because the requests indicated by "CPU#0"-"CPU#4" are stored in the SM module 710 that 710 is attached to a frame described as "CPU#0"-"CPU#4". 720 is attached to a frame described as "IO#0"-"IO#4" for the same reason.

In this case, priority is given to the system board 10. According to the conventional rule (initial state), priority is given in the order of "IO#0"-"IO#4". When the temporary rule is applied (initial state), priority is given to "CPU#0"-"CPU#4". A plurality of un-processed requests exists in all the units. In such a state, the priority logic 731 selects requests in the order shown in FIG. 8B. Since the period A is long by three-request selection, requests issued by the system board 10 is sequentially selected once during each period A according to priority. While the requests are selected, requests issued by the IO unit 20 are also sequentially selected according to priority.

Figure 4:
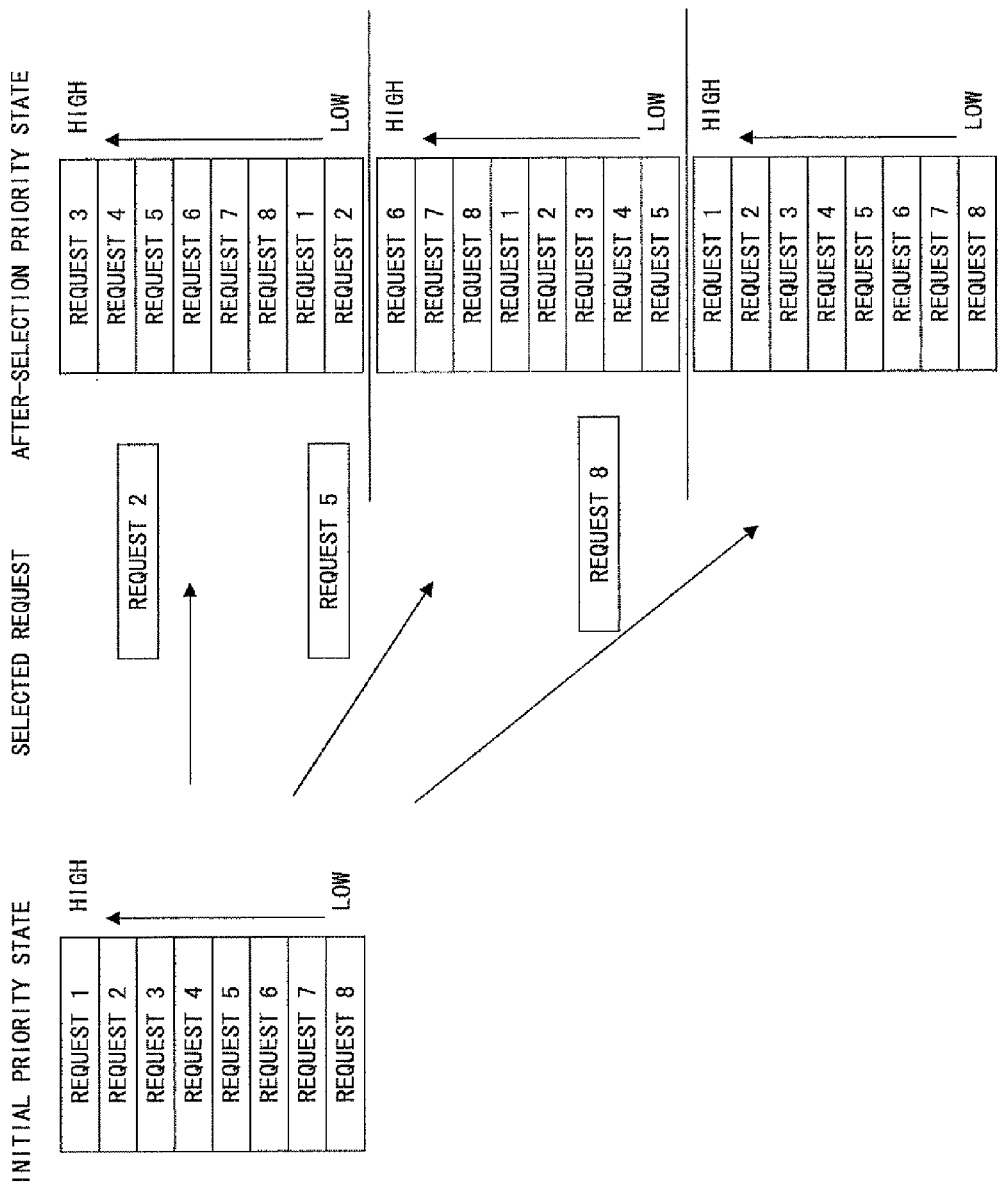
FIG. 4 shows priority determined by a rule adopted in the convention arbiter.
Figures 5A, 5B:
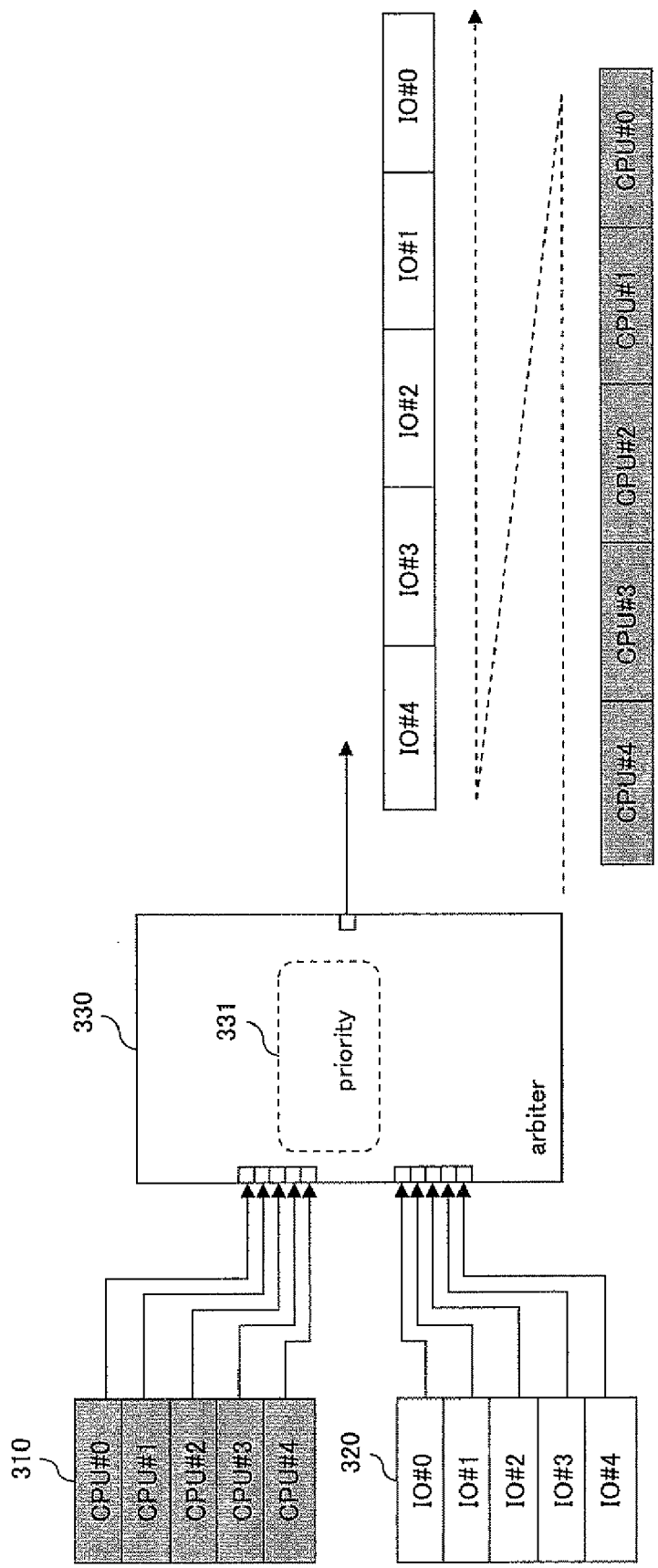
FIGS. 5A and 5B show the order of requests selected by the conventional arbiter in the case where five system boards 10 and five IO units are mounted.
Figures 6A, 6B:
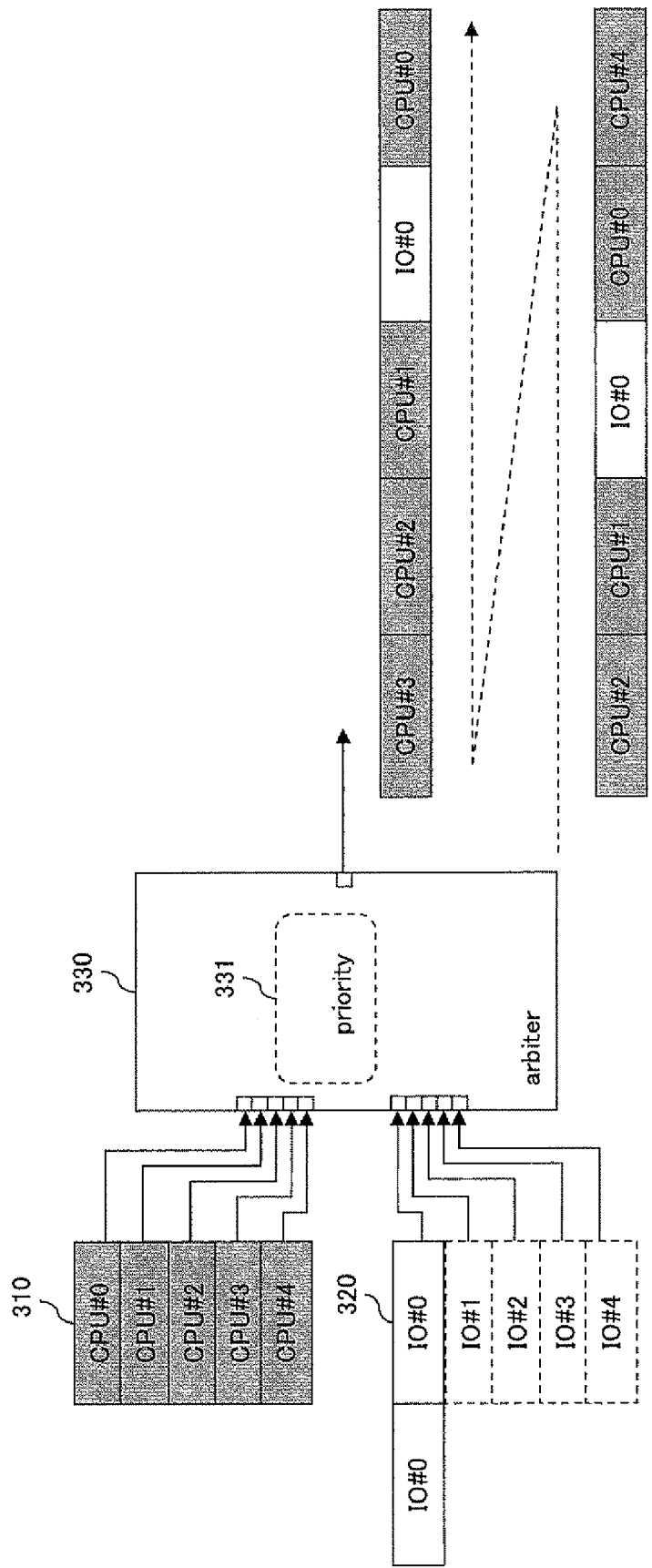
FIGS. 6A and 6B show the order of requests selected by the conventional arbiter in the case where five system boards 10 and one IO unit are mounted.

As described above, by regularly validating the temporary rule, a request issued by a unit of priority type can be compulsorily selected at desired time intervals. The number of times per unit time a request issued by a unit of priority type can be maintained regardless of a request state. Therefore, when priority is given to a unit with a high possibility that the process time of an issued request may become long, the process time of a request issued by a unit of priority type can be shorter than that in the case where only the rule shown in FIG. 4 is valid. Thus, performance degradation due to a long process time can be suppressed, thereby surely avoiding system stoppage due to timeout.

A managing board (MB) 50 executes various instructions for each of units (chip units) 10-40 or obtains such information. Each of the units 10-40 comprises a setting register inside it and various settings are stored in the register. Thus, by storing the settings of the temporary rule, a priority type and the like and operating the priority logic 731 according to the settings stored in the register, the above-described operations can be performed.

When the cycle of the clock inputted to the counter 733 is made variable, the setting of the length of the period A can also be stored in the register. Alternatively, the setting of the number of requests compulsorily selected during each period A can also be stored. Thus, various variations are possible.

The Second Preferred Embodiment

In the above-described first preferred embodiment, priority setting is fixed to a unit type in which a request is selected when the temporary rule is valid. However, in the second preferred embodiment, requests are sampled and priority setting is automatically changed according to the result. Since the setting is changed according the result of sampling requests, appropriate priority can be selected according to its state. Thus, performance degradation can be more suppressed, thereby more surely avoiding the system stoppage due to timeout.

In the second preferred embodiment, the same reference numerals are attached to the same or basically the same units as in the first preferred embodiment. Thus, in the second preferred embodiment, parts different from the first preferred embodiment are focused and described.

Figure 9:
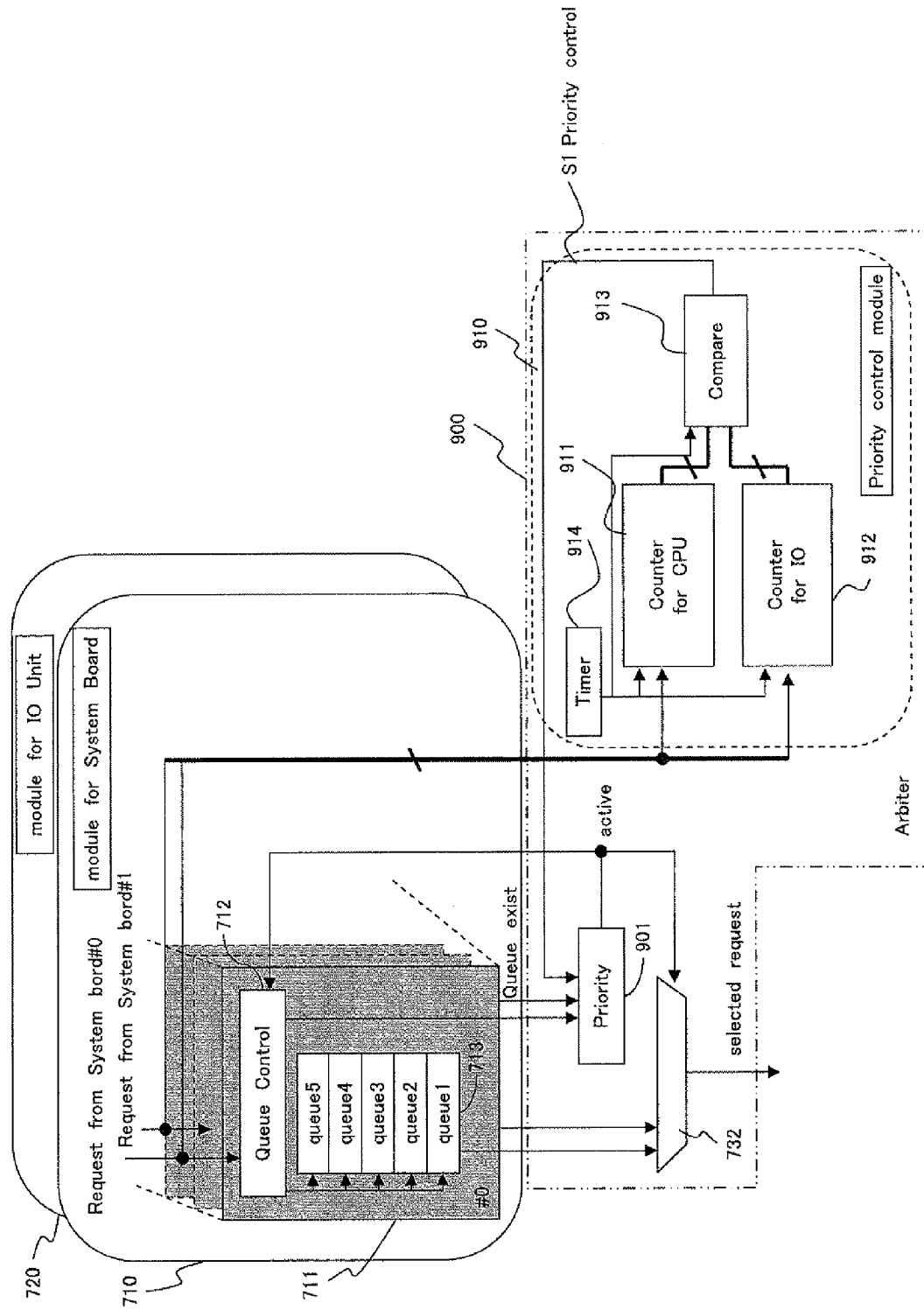
FIG. 9 shows the configuration of the arbiter of the second preferred embodiment.

FIG. 9 shows the configuration of the arbiter of the second preferred embodiment. As in the first preferred embodiment, its arbiter 900 is mounted on the address crossbar shown in FIG. 1 or 2 in order to select requests issued by each of the system boards 10 and IO units 20. Thus, the crossbar of this preferred embodiment can be realized as an address crossbar 30 mounting the arbiter 730. The information processing device of this preferred embodiment is realized by the crossbar 30 connecting the system boards 10 and the IO units 20 each other.

Requests issued and outputted by the system boards 10 and IO units 20 are temporarily stored in the SM module 710 and the IO module 720, respectively. The arbiter 900 comprises a priority control module 910 for sampling requests stored in each of the modules 710 and 720 for each of the modules 710 and 720 and setting priority. As shown in FIG. 9, the module 910 comprises two counters 911 and 912, a comparator 913 and a timer 914.

Every time a request is inputted to one of the queue buffer units 711 mounted on the SM module 710, one pulse is outputted to the counter 911 for counting requests issued by the system boards 10. Similarly, every time a request is inputted to one of the queue buffer units 711 mounted on the IO module 720, one pulse is outputted to the counter 912 for counting requests issued by the IO units 20. The counters 911 and 912 are reset by a carrier signal outputted at certain time intervals by the timer 914. Thus, the counters 911 and 912 count the number of requests issued by the system boards 10 and the IO units 20, respectively, during the certain period.

The carrier signal outputted by the timer 914 is inputted to the comparator 913. When the carrier signal (for example, active one whose logical value 1) is inputted, the comparator 913 compares respective counts (number of requests issued during a certain period) immediately before inputted from the counters 911 and 912 and outputs the comparison result to the priority logic 901 as a priority signal S1. If the count of the counter 911< the count of the counter 912, the logical value of the signal S1 is 1 (its level is "H"). If the count of the counter 911≧ the count of the counter 912, the logical value of the signal S1 is 0 (its level is "L"). When the logical value must be changed, it is determined whether to change it on the basis of the comparison result.

FIG. 10 shows the relationship between the level of a priority control signal S1 and a priority type to be given. In FIG. 10, a "setting mode" is set according to whether it is priority type, and in a "CPU priority" mode, priority is given to the system board 10. In an "IO priority" mod, priority is given to the IO unit 20. Thus, FIG. 10 shows that the CPU priority mode is set when the level of the priority signal S1 is "H" and the IO mode is set when the level of the priority signal S1 is "L". Generally such a mode seeing is adopted because the degradation of system performance is more effectively suppressed if priority is given to a request issued by a unit, the total number of requests of which is smaller.

The priority logic 901 monitors the priority control signal S1 and operates in a mode specified the level of the signal S1. As shown in FIG. 11A, the logic 901 comprises a CPU priority logic (described as "CPU_priority" in FIG. 10) 1001 for selecting a request issued by the system board 10, an IO priority logic (described as "IO_priority" in FIG. 10) 1002 for selecting a request issued by the IO unit 20 and an ALL priority logic (described as "ALL_priority" in FIG. 10) 1003 for receiving the selection results of the logics 1001 and 1002 and selecting one of them.

Each of the logics 1001 and 1002 selects requests according to, for example, the rule shown in FIG. 4. Thus, when each of the logics 1001 and 1002 inputs its selection result, the logic 1003 selects a selection result specified by the signal level with priority. Therefore, requests issued by units of priority type are selected until there remains no such request and requests issued by units of non-priority type are selected after that.

FIGS. 11A and 11B show the order of requests selected by the arbiter 900 of the second referred embodiment in the case where there is a plurality of requests issued by each of five system boards 10 and there is a plurality of requests issued by the IO unit 20. FIG. 11A shows un-processed requests left in each unit and FIG. 11B shows the actually selected order of requests.

In this case, priority is given to the IO unit 20. As to requests issued by the system board 10 (initial state), priority is given in the order of "CPU#0"-"CPU#4". None of the IO units issues a new request. Thus, if IO priority mode is set in the state shown in FIG. 11A, specifically the level of the priority control signal S1 is "H", as shown in FIG. 11B, requests issued by the system boards 10 are sequentially selected according to priority after two requests IO#0 are consecutively selected.

In the second preferred embodiment, requests issued by one of the system boards 10 and the IO units 20 continues to be selected according to priority specified the signal level until there remains no request. However, such selection according to priority can also be made valid only during a predetermined period or only predetermined number of times. When it is valid only during the period or only the number of times, the period or the number of times can also be automatically set according to the sampling result of requests.

As to the mode setting for giving priority to one of the system boards 10 and IO units 20, relationship to be met can also be defined for each mode. More specifically, for example, the CPU priority mode can also be set if the count of the counter 911< the count of the counter 912-α (predetermined constant). This also applies to the setting of the IO priority mode. When neither the IO priority mode nor CPU priority mode is set, requests can also be selected according to the rule shown in FIG. 4, using three logics 1001-1003. Alternatively, the constant α, a time interval counted by the timer 914 or the like can be arbitrarily set using the managing board 50, SAL (scientific applications on Linux) or the like.

Since units (processing units) that can be arbitrarily mounted are limited to two types of the system board 10 and IO unit 20, in this preferred embodiment, units are grouped by the type. Thus, the number of groups is 2. However, if unit types other than the system board 10 and the IO unit 20 can also be mounted or at least one of them can be further classified into a plurality of types, they can also be divided into three or more groups and one can also be selected from requests selected for each group according to priority among the groups. Thus, the type and number of mountable units are not limited.

What is claimed is:

1. An arbiter mounted on a crossbar in which a plurality of units capable of issuing a request are connected, for selecting a request among requests issued by the units each of which belongs to one of a plurality of groups of units, the arbiter comprising:

a plurality of first request selection parts, each of the first request selection parts corresponds to one of a different groups of units, and that selects a request among requests issued by the units belong to the same group of units corresponds to the first request selection part, respectively;

second request selection part for selecting a request among the requests selected for each of the groups of units by the first request selection parts; and selection control part for enabling the second request selection part to select a request among requests issued from the groups of units according to a predetermined priority of each group of units among the plurality of groups; wherein the priority of each group of units among the groups is changed at prescribed time intervals.

2. The arbiter according to claim 1, wherein one or more system boards mounting one or more CPUs and one or more IO units for connection with peripheral devices are connected to the crossbar as the units, and a first group among the plurality of groups includes only the system boards belong and a second group among the plurality of groups includes only the IO units, and the selection control part temporarily makes priority of the first group higher than that of the second group.

3. An arbiter in which a plurality of units are connected to, for selecting one of requests issued by the units, the arbiter comprising:

first request selection part that selects, for each of a plurality of groups in which the units belong to one of the groups, one of the request issued by the units belong to the same groups, respectively;

second request selection part that selects one of the the requests selected for each of the groups by the first request selection part; and selection control part that enables the second request selection part to select one of the requests according to a predetermined priority of each group among the plurality of groups; wherein the priority of each group among the groups is dynamically changed.

4. The arbiter according to claim 3, wherein the selection control part comprises a plurality of counting part that counts a number of the requests is issued by each of the groups, and the priority of each group is dynamically changed based upon the number of counted issued requests for each group.

5. The arbiter according to claim 4, wherein the selection control part gives top priority to a group in which the corresponding number of the counted issued requests is smallest among the groups.

6. The arbiter according to claim 3, wherein one or more system boards mounting one or more CPUs and one or more IO units for connection with peripheral devices are connected to the crossbar as the units, and the plurality of groups are divided into two of a first group to which only the system boards belong and a second group to which only the IO units belong.

7. A crossbar to which a plurality of units are connected, the plurality of units are divided into a plurality of groups, the crossbar comprising:

first request selection part that selects one of requests issued by of the units belonging to the same group for each groups respectively;

second request selection part that selects one of the requests selected by the first request selection part; and selection control part that enables the second request selection part to select requests according to priority of each group among the groups that change at predetermined time intervals, wherein the request selected by the second request selection part to a unit which is a destination of the request.

8. The arbiter according to claim 7, wherein when one or more system boards mounting one or more CPUs and one or more IO units for connection with peripheral devices are connected to the crossbar as the units, the plurality of groups are divided into two of a first group to which only the system boards belong and a second group to which only the IO units belong.

9. A request selection method for enabling a crossbar to which each of a plurality of units are connected to select one from requests issued by the plurality of units, comprising:

selecting one request from requests issued by the units belonging to the same group of units, for each of the groups of units contains a plurality of units, respectively; and selecting one request from the requests selected for each of the groups according to priority among the groups which changes at predetermined time intervals.

10. The request selection method according to claim 9, wherein when one or more system boards mounting one or more CPUs and one or more IO units for connection with peripheral devices are connected to the crossbar as the units, the plurality of groups are divided into two of a first group to which only the system boards belong and a second group to which only the IO units belong.

11. An information processing device, comprising:

a plurality of processing units which are divided into a plurality of groups, each of the processing units is capable of issuing requests;

first request selection part for arbitrating the requests issued from the plurality of processing units within a same group, and selecting one of requests issued from the processing units belonging to the same group, for each of the groups respectively;

second request selection part for selecting one of the requests selected for each of the groups by the first request selection part; and selection control part for enabling the second request selection part to select requests according to predetermined priority of each group among the plurality of groups; wherein the priority among the groups is periodically changed.

* * * * *

UNITED STATES PATENT AND TRADEMARK OFFICE
CERTIFICATE OF CORRECTION

| | | |
|---|---|---|
| PATENT NO. | : 7,830,902 B2 | Page 1 of 1 |
| APPLICATION NO. | : 11/740658 | |
| DATED | : November 9, 2010 | |
| INVENTOR(S) | : Junji Ichimiya et al. | |

It is certified that error appears in the above-identified patent and that said Letters Patent is hereby corrected as shown below:

Column 1, Line 9, delete "2006 ," and insert --2006,--, therefor.

Column 10, Line 65, after "one of the" delete "the".

Column 11, Line 9, after "requests" delete "is".

Column 11, Line 29, after "by" delete "of".

Column 11, Line 29, delete "group for" and insert --group, for--, therefor.

Column 12, Line 29, delete "one of" and insert --one of the--, therefor.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,830,902 B2
APPLICATION NO. : 11/740658
DATED : November 9, 2010
INVENTOR(S) : Junji Ichimiya et al.

Page 1 of 1

It is certified that error appears in the above-identified patent and that said Letters Patent is hereby corrected as shown below:

Column 10, Lines 56-57 in Claim 2, please remove "priority of the first group" and insert -- priority of the second group --.

Column 10, Line 57 in Claim 2, please remove "that of the second group" and insert -- that of the first group --.

Signed and Sealed this
Fourteenth Day of June, 2011

David J. Kappos
*Director of the United States Patent and Trademark Office*